(12) United States Patent
Pinkos (10) Patent No.: US 7,264,309 B2
(45) Date of Patent: Sep. 4, 2007

(54) METHOD AND APPARATUS FOR ATTACHING SENSORS TO A SEAT ASSEMBLY

(75) Inventor: Andrew F. Pinkos, Clarkston, MI (US)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 11/001,479

(22) Filed: Dec. 1, 2004

(65) Prior Publication Data

US 2005/0110312 A1    May 26, 2005

Related U.S. Application Data (62) Division of application No. 09/788,827, filed on Feb. 20, 2001.

(60) Provisional application No. 60/186,579, filed on Mar. 2, 2000.

(51) Int. Cl.
*A47C 31/00* (2006.01)
(52) U.S. Cl. .............................. 297/217.1; 297/217.2; 297/217.3; 5/653; 340/665
(58) Field of Classification Search ................ 340/665, 340/666, 667; 297/452.6, 180.12, 217.1, 297/217.2, 217.3, 284.1, 284.2; 5/653, 655.9, 5/693, 694, 424, 713
See application file for complete search history.

(56) References Cited

U.S. PATENT DOCUMENTS

| 2,592,725 A | | 4/1952 | Oram |
| 3,736,022 A | | 5/1973 | Radke |
| 3,766,344 A | | 10/1973 | Nevett |
| 3,807,800 A | * | 4/1974 | Morrison et al. ...... 297/452.56 |
| 4,699,375 A | * | 10/1987 | Appelbaum et al. .......... 482/81 |
| 4,878,792 A | * | 11/1989 | Frano .......................... 411/339 |
| 5,293,039 A | * | 3/1994 | Mongiols ................ 250/227.16 |
| 5,302,001 A | * | 4/1994 | van Dis .................. 297/228.13 |
| 5,474,327 A | | 12/1995 | Schousek |
| 5,515,933 A | * | 5/1996 | Meyer et al. ................ 180/273 |
| 5,570,903 A | | 11/1996 | Meister |
| 5,612,876 A | * | 3/1997 | Zeidler et al. ................. 701/45 |
| 6,283,504 B1 | * | 9/2001 | Stanley et al. .............. 280/735 |

FOREIGN PATENT DOCUMENTS

| DE | 197 09 197 A1 | 10/1997 |
| DE | 19646480 A1 | 5/1998 |
| EP | 0 656 283 B1 | 7/1995 |
| EP | 0785101 A2 | 7/1997 |
| EP | 0855307 A2 | 7/1998 |
| EP | 0893300 A2 | 1/1999 |
| EP | 0 962 362 A2 | 8/1999 |
| EP | 0 721 863 B1 | 5/2000 |
| FR | 2147666 | 3/1973 |
| WO | WO 9841424 A1 | 9/1998 |

* cited by examiner

Primary Examiner—Laurie K. Cranmer (57) ABSTRACT

A vehicle seat assembly includes a sensor assembly that is used to provide data for an occupant classification system. The data is used to determine such characteristics as seat occupant weight and position. These characteristics are used to control deployment of a safety restraint mechanism such as an airbag. The sensor assembly is part of a mat that is placed on top of a foam cushion used to form a seat bottom. Fasteners are used to permanently attach the mat to the foam to restrict lateral and vertical movement of the mat relative to the foam.

28 Claims, 5 Drawing Sheets

METHOD AND APPARATUS FOR ATTACHING SENSORS TO A SEAT ASSEMBLY

RELATED APPLICATION

This application is a divisional of 09/788,827 filed Feb. 20, 2001 which claims priority to U.S. Provisional Application No. 60/186,579 filed on Mar. 2, 2000.

BACKGROUND OF THE INVENTION

1. Field of the Invention

This invention relates to a method and apparatus for attaching a sensor assembly to a vehicle seat. Specifically, the sensor assembly is part of a mat that is permanently attached to a seat foam cushion with the use of fasteners.

2. Related Art

Vehicle seat assemblies often include a variety of sensors that are used to provide data concerning a seat occupant. This data can be used to derive information such as seat occupant weight and seat occupant position. This information is useful for controlling safety restraint devices such as airbags.

These seat sensors must be securely placed in the seat such that consistent and accurate data is provided. Current sensor assemblies are located in a sensor assembly mat that is placed on top of a seat cushion formed from a foam member. This mat is secured to the top surface of the foam member with an adhesive. Adhesive attachment is classified as a temporary attachment and has several disadvantages. One disadvantage is that over the course of time, as the adhesive bond degrades, the mat can move laterally and vertically with respect to the foam, which can compromise the accuracy of the data. Further, shifting of the occupant on the seat can dislodge or move the sensors out of their proper location. Another disadvantage is that the mat can be displaced during seat cushion repair. Once the sensors have been shifted, it is difficult to properly reposition the sensors.

Thus, it is desirable to have a method and apparatus for permanently attaching a sensor mat assembly to a foam cushion without the use of adhesives. The method and apparatus should be easy assemble and to install, and should overcome the above referenced deficiencies with prior art systems.

SUMMARY OF THE INVENTION

A sensor mat assembly is installed in a vehicle seat to provide data for an occupant classification system. The mat is attached to a foam member that is used to form a seat bottom. At least one fastener is inserted through the mounting portion and into the seat cushion, permanently attaching the mat to a top surface of the foam member and restricting lateral and vertical movement of the mat relative to the foam member.

In one disclosed embodiment, the fastener includes a first member having a plurality of hooks and a second member having a plurality of rings. Preferably, one of the first or second members is integrally formed within the foam and the other of the first or second members is adhered to the mounting portion. When the mat is placed on the top surface of the foam member, the hooks engage the rings to securely attach the mat to the foam.

In another disclosed embodiment, the foam member includes a central area and a pair of side bolsters having a greater thickness than the central area. The central area and the bolsters are separated from one another by trenches formed within the foam. The mat mounting portions include ear extensions formed about the circumference of the mat. The ear extensions are spaced apart from each other and extend at least partially into the trenches. The fastener is comprised of a plurality of rings that secure the ear extensions to a wire embedded in the foam of the trenches.

In another disclosed embodiment, the fastener has a top head portion and a bottom head portion interconnected by a shaft extending at a right angle relative to the top head portion. The fastener is inserted through the mounting portion and into the foam such that the top head portion rests against the mat and the bottom head portion rests against a bottom surface of the foam.

In another disclosed embodiment, the fastener has a head portion and a body portion extending at an acute angle relative to the head portion to terminate at a barbed distal end. The foam member includes a plurality of angled bores for receiving the fasteners. The fasteners are inserted through the mounting portion into the bores such that the head portion rests against a top surface of the mat and the barbed distal end does not extend beyond the bottom surface of the foam.

In another embodiment, the fastener has a head portion and a spiral body portion that is rotated into engagement with the foam until the head portion rests against the mat. The fastener can be made from spring steel or from plastic.

The method for attaching the sensor mat to a foam seat cushion having a top surface and a bottom surface includes the following steps. The mat is placed on the top surface of the foam seat cushion and the mat is fastened to the foam with at least one fastener. This method provides a simplified and economical apparatus for permanently attaching a sensor mat to a foam seat cushion. The attachment method restricts lateral and vertical movement of the mat relative to the foam, which results in improved consistency and accuracy for the sensors over the life of the vehicle.

These and other features of the present invention can be best understood from the following specification and drawings, the following of which is a brief description.

DETAILED DESCRIPTION OF AN EXEMPLARY EMBODIMENT

Figure 1:
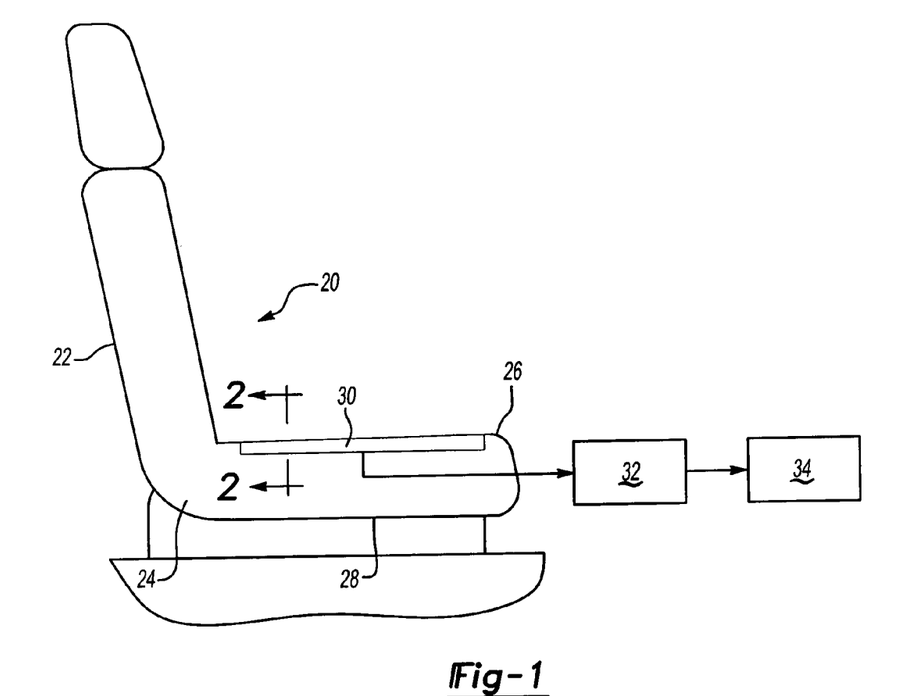
FIG. 1 is a schematic view showing a vehicle seat incorporating the subject sensor assembly for use with an occupant classification system.

A vehicle seat assembly for use with an Occupant Classification System (OCS) is shown generally at 20 in FIG. 1. The seat includes a seat back 22 and a seat bottom 24 that are preferably formed from foam members. The seat bottom foam member 24 has a top surface 26 and a bottom surface 28. The formation of foam members for seat cushions is well known in the art and will not be discussed in detail.

A sensor mat 30, which provides data to a central computer or microprocessor 32, is positioned near the top surface 26 of the seat bottom foam member 24. The computer 32 determines characteristics such as seat occupant weight and seat occupant position from the sensor data. The computer 32 controls deployment of a safety restraint device 34, such as an airbag, based on these characteristics.

For example, the airbag will be deployed only if the seat occupant weight exceeds a certain predetermined minimum weight. Additionally, the airbag will only deploy if the occupant is positioned at a predetermined distance away from the deployment area.

Figure 2:
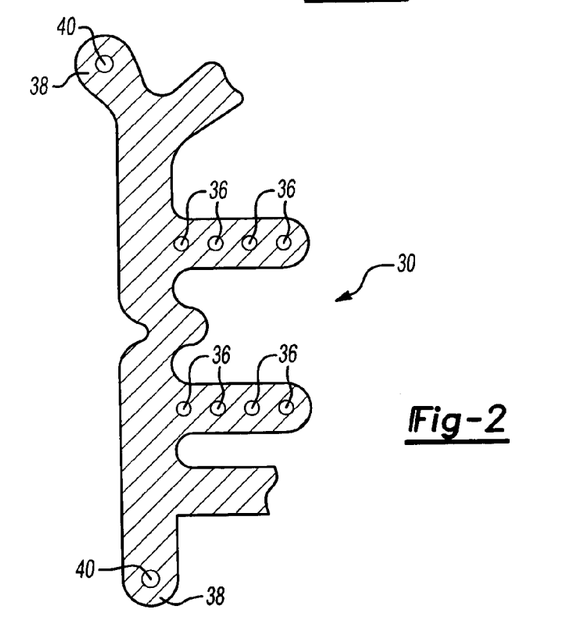
FIG. 2 is a top view of a sensor mat assembly partially cut away.
Figures 9, 10:
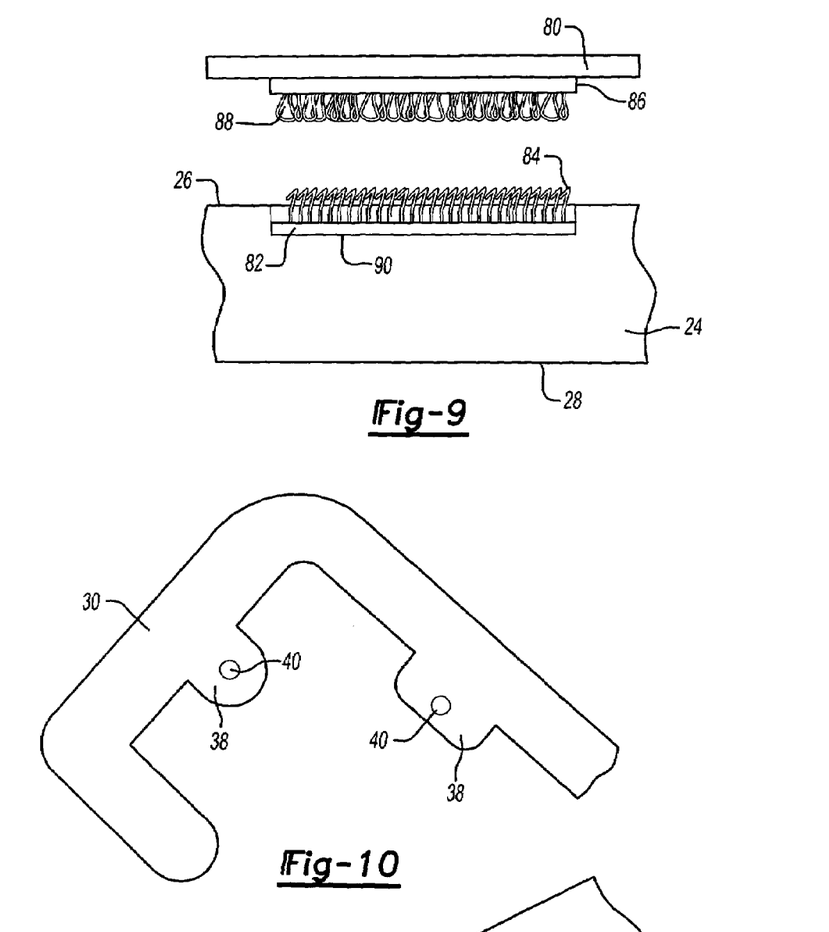
FIG. 9 is a cross-sectional view of the fastener embodiment of FIG. 8.
FIG. 10 is an alternate embodiment of a sensor mat assembly.

The mat 30 is shown in greater detail in FIG. 2. A plurality of sensors 36 are positioned at various locations within the mat, as is known in the art. A plurality of ear extensions 38 are formed about the circumference of the mat 30. The ear extensions 38 can extend outwardly as shown in FIG. 2 or inwardly as shown in FIG. 10. The ear extensions 38 serve as mounting portions that include openings 40 for receiving fasteners. While ear extensions 38 are preferred other know mounting portion formations could also be used. The ear extensions 38 simply facilitate the use of fasteners.

The use of fasteners to attach the mat 30 to the foam member 24 forms a permanent attachment that restricts lateral and vertical movement of the mat 30 and sensors 36 relative to the foam member 24. This attachment eliminates the need for adhesives, simplifies the assembly process, and allows for easier repairs that do not compromise OCS integrity.

Figures 3, 4:
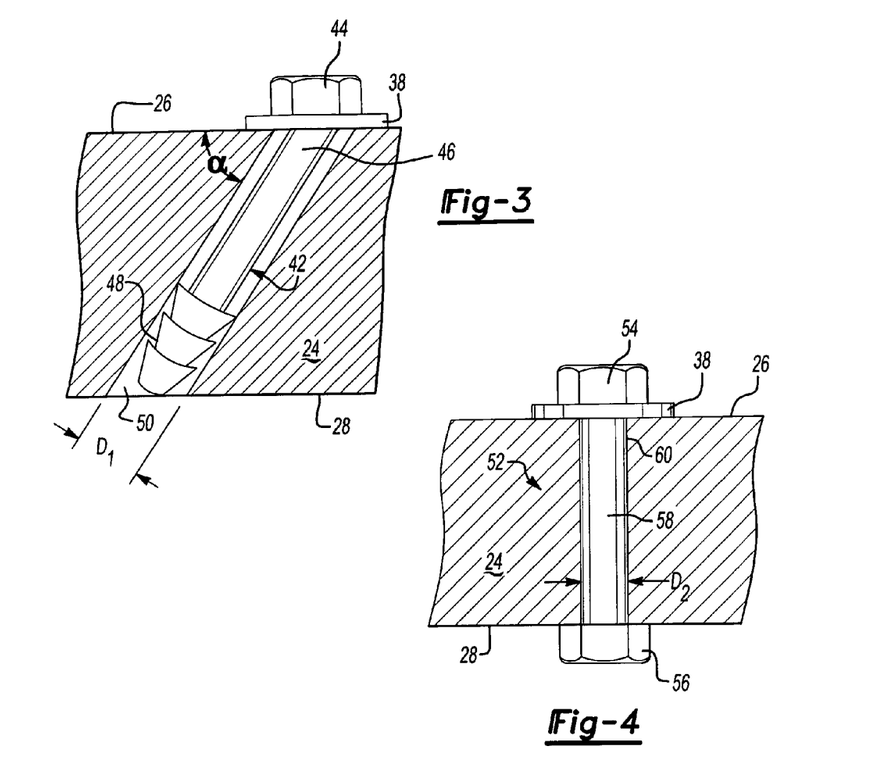
FIG. 3 is a cross-sectional view of one fastener embodiment.
FIG. 4 is a cross-sectional view of an alternate fastener embodiment.

One embodiment of a fastener 42 is shown in FIG. 3. The fastener 42 includes a head portion 44 and a body or shaft portion 46. The head portion 44 is of larger diameter than the shaft portion 46, which terminates at a barbed distal end 48. The shaft portion 46 is preferably orientated at an acute angle "α" relative to the head portion 44. A corresponding angled bore 50 having a predetermined diameter D1 is formed in the foam. The fastener 42 is inserted into the bore 50 such that the barbed distal end 48 does not extend beyond the bottom surface 28 of the foam member 24. The barbs are orientated such that the fastener 42 cannot be removed once it has been inserted into the bore 50.

Angular penetration of the fasteners 42 is important to the comfort of the seat occupant. The fastener 42 should also meet predetermined flexibility and force retention requirements. These requirements vary depending upon the seat application and environment. Flexibility is required for stress reduction on the OCS and for occupant comfort. Force restrictors, the barbed distal end 48, provide easy penetration for installation but restrict removal. The head 44 and shaft 46 portions are designed to allow forces to be spread out and for lateral forces to be concentrated into the foam to restrict movement. Other important parameters are the bore diameter D1, the angle "α", the diameter of the shaft portion 46, and the barbs. These parameters will vary depending on the specifications for each different seating application.

Another embodiment of a fastener 52 is shown in FIG. 4. This fastener 52 is a double-headed fastener having a top head portion 54 and a bottom head portion 56 interconnected by a narrow shaft 58. The shaft 58 is preferably orientated at a right angle to the top 54 and bottom 56 head portions. A vertical bore 60 having a predetermined diameter D2 is formed in the foam. The fastener 52 is inserted into the bore 60 such that the top head portion 54 is positioned adjacent to the top surface 26 of the foam member 24 and the bottom head portion 56 is positioned adjacent to the bottom surface 28. The bottom head portion 56 prevents removal of the fastener 52 once it is installed.

The fastener 52 should also meet predetermined flexibility and force retention requirements. These requirements vary depending upon the seat application and environment. Flexibility is required for stress reduction on the OCS and for occupant comfort. The shaft 58 is preferably made from a flexible material that could be woven. The bottom head portion 56 restricts removal. The head 54 and shaft 58 are designed to allow forces to be spread out and for lateral forces to be concentrated into the foam to restrict movement. Other important parameters are the bore diameter D2 and the diameter of the shaft 58. These parameters will vary depending on the specifications for each different seating application.

Figure 5:
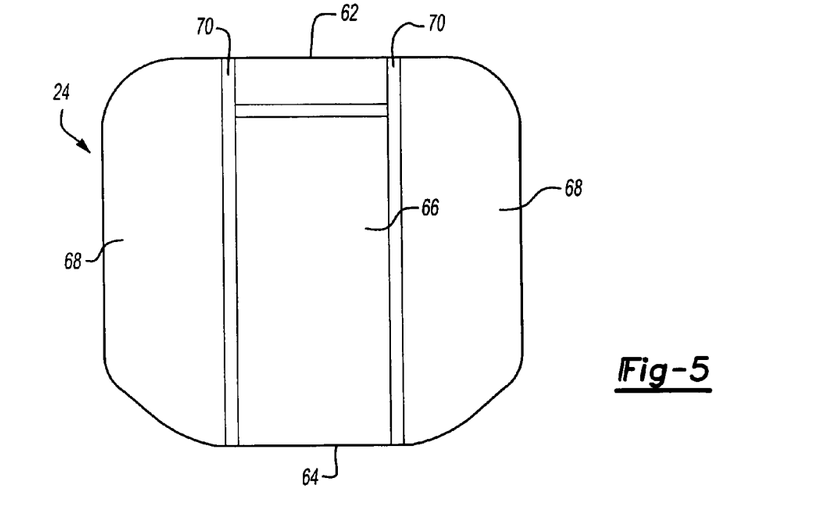
FIG. 5 is a top view of one embodiment of a seat bottom foam cushion.
Figure 6:
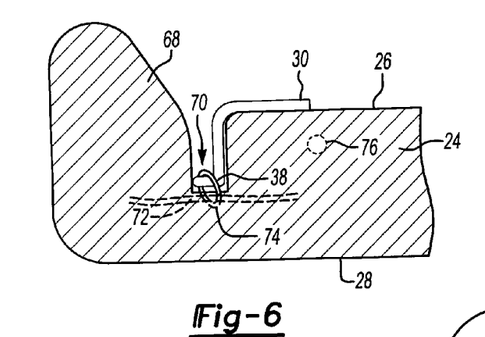
FIG. 6 is a cross-sectional view of an alternate fastener embodiment for use with the cushion of FIG. 5.
Figure 7:
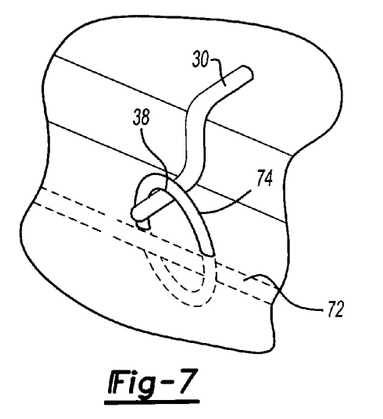
FIG. 7 is a perspective view, partially cut away, of the embodiment of FIG. 6.

Another fastener embodiment is shown in FIGS. 5-7. FIG. 5 shows a top view of the foam member 24, which has a front 62, a rear 64, a central region 66, and a pair of side bolsters 68. The side bolsters 68 are of greater thickness than the central region 66 and are separated from the central region 66 by trenches 70 formed in the foam. The central region 66 defines the general insert area that will receive the mat 30.

As shown in FIG. 6, a wire 72 is embedded in the foam in the trench 70. The wire 72 is typically used to secure the seat trim to the foam via the use of a round wire called a "hog-ring". In this embodiment, the ear extensions 38 of the mat 30 extend at least partially into the trench 70 and are secured to the wire 72 with hog-rings 74, see FIG. 7. Alternatively, the wires could be embedded elsewhere in the foam, see dashed lines at 76 (FIG. 6).

Figure 8:
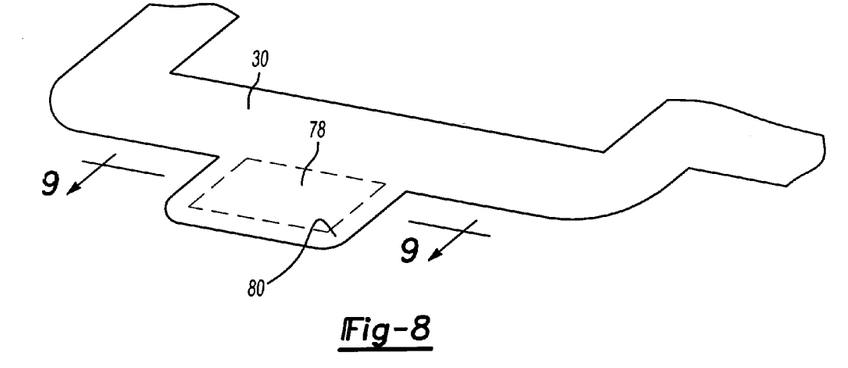
FIG. 8 is a top view of a sensor mat assembly incorporating an alternate fastener embodiment.

An alternate fastener embodiment 78 is shown in FIGS. 8-9. This embodiment incorporates a hook-ring attachment, more commonly known as VELCRO®. The fastener 78 can be utilized with a mat 30 having ear extensions 38 or can be used in a mat 30 having larger tab sections 80 formed about the circumference as shown in FIG. 8. The fastener 78 includes a first member 82 having a plurality of hooks 84 and a second member 86 having a plurality of rings 88, shown in FIG. 9. Preferably, one of the first 82 or second 86 members is integrally formed within the foam and the other of the first 82 or second 86 members is joined to the tab section 80. When the mat 30 is placed on the top surface 26 of the foam member 24, the hooks 84 engage the rings 88 to attach the mat 30 to the foam member 24.

In the preferred embodiment, the first member 82 is placed and securely held in position within the seat foam pad tool before the liquid foam is poured into the tool. After the liquid foam is cured, the foam partially surrounds the first member 82. This forms a permanent bond between the cured foam member 24 and the first member 82. The second member 86 is preferably secured to the mat 30 through the use of an adhesive, or with one of the disclosed fastener embodiments. The second member 86 is laid on top of the first member 82 and pressure is applied to both the mat 30 and the foam member 24 to bond the hooks 84 to the rings 88. A depression 90 is formed within the foam member 24 to allow the assembled mat 30 and foam member 24 to remain flush.

The adhesive or fastener holding the second member 86 to the mat 30, the hook 84 and ring 88 bond, and the bond between the first member 82 and the foam member 24 meet the requirements for classification as a permanent attachment method. An advantage with this embodiment is that the sensor mat 30 can be re-positioned before permanently creating the hook 84 and ring 88 linkage.

Another fastener embodiment is shown in FIGS. 10-14. As discussed above, the mat 30 includes ear extensions 38 can extend outwardly as shown in FIG. 2 or inwardly as shown in FIG. 10. The extensions include openings 40 that receive wire or plastic spiral clips 92, see FIGS. 11 and 12. The spiral clip 92 includes a head portion 94 and a spiral body 96 of length "l" that is rotated or screwed into the foam member 24 to secure the mat 30 to the foam member 24. The inwardly extending ear extensions 38 are preferred with this embodiment as the force vectors at these locations will limit the strain on the mat 30 and further, this location will minimize adverse affects on occupant usage and comfort. A plurality of extensions 38 are needed to securely attach the mat 30 to the foam member 24.

Figure 13:
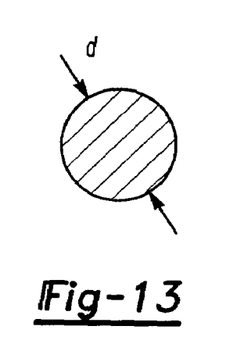
FIG. 13 is a cross-section taken along line A-A of one embodiment of a fastener from FIG. 12.

A cross section of a wire spiral clip is shown in FIG. 13. The wire properties are chosen such that the wire diameter "d" and the wire material will allow a spiral configuration. Further, the spring rate of the spiral wire should be equal to or less than the seat foam pad density (spring rate). When this is accomplished, the durability of the foam is not compromised. The wire diameter "d" is also important in determining the force required to insert the spiral wire into the foam.

Figure 14:
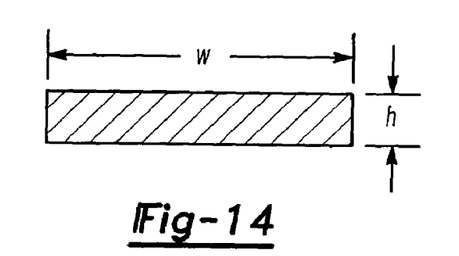
FIG. 14 is a cross-section taken along line A-A of an alternate embodiment of a fastener from FIG. 12.

A cross-section of a plastic wire spiral clip is shown in FIG. 14. The plastic clip is preferably rectangular in shape with the width "w" being greater than the height "h".

Figure 11:
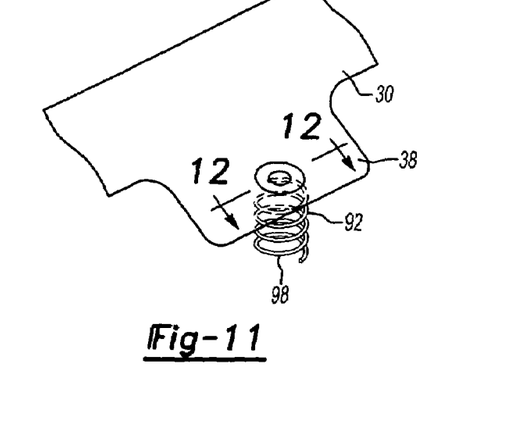
FIG. 11 is a perspective view of an alternate fastener embodiment.
Figure 12:
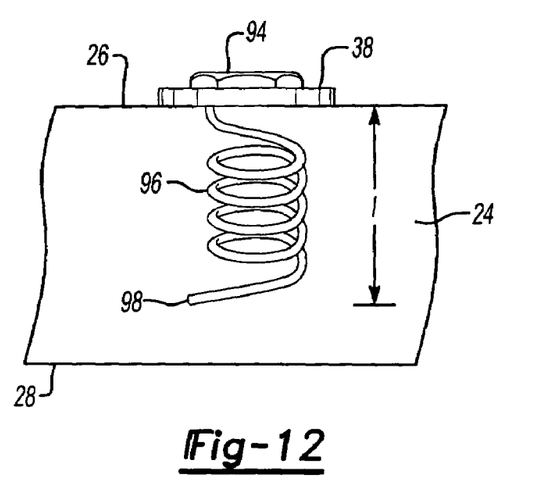
FIG. 12 is a cross-sectional view of the embodiment of FIG. 11.

In the preferred embodiment, the spiral body 96 is formed with a clock-wise twist. A distal end 98 is place through the respective opening 40 of the ear extension 38. By applying a clock-wise torque to the clock-wise spiral body 96, the clip 92 will penetrate the foam member 24 and penetration will continue until the head portion 94 contacts the ear extension 38 and the applied torque surpasses a previously established threshold level. When this is achieved, there is sufficient perpendicular force applied by the clips 92 to the extensions 38 to secure the mat 30 to the foam member 24.

There are several advantages with the embodiments of FIGS. 10-14. It is a low cost method and no modifications or additional process steps are required for the foam member 24. There are also known automated tooling methods for this assembly. When a wire spiral clip 92 is used, there is a chemical bond between the wire and the foam once the wire is allowed to oxidize. This will secure the wire clip 92 to the internal foam pad and not allow the wire to move within the pad or unscrew. However, the clip 92 can be unscrewed for repositioning of the mat 30 if required during assembly.

A spool of uncut, unbent wire can be used in the manufacturing of the spiral wire clips 92, which when cut will add chiseled end to the wire to reduce forces experience by the wire clips during installation, allowing for lower spring rates.

The method for attaching the sensor mat 30 to the foam seat cushion 24 with the top surface 26 and bottom surface 28 includes the following steps. The mat 30 is placed on the top surface 26 and the mat 30 is fastened to the foam member 24 with at least one fastener. In one embodiment, a plurality of fasteners are screwed into the foam member 24. In another embodiment, angled bores 50 are formed in the foam member 24 and a plurality of barbed fasteners are inserted into the bores 50 such that once inserted, the fasteners cannot be removed. In another embodiment, vertical bores 60 are formed in the foam and a plurality of double headed fasteners are inserted into the bores 60 such that a top head portion 54 is positioned adjacent the top surface 26 and a bottom head portion 56 is positioned adjacent the bottom surface 28. In an alternate embodiment, at least one trench 20 is formed in the foam member 24, a wire 72 is embedded within the trench 20, a mounting portion of the mat 30 is placed in the trench 20 and the mounting portion is secured to the wire 72 with at least one hog ring 74. In an alternate embodiment, a hook-ring attachment method is used.

This method provides a simplified and economical apparatus for permanently attaching a sensor mat 30 to a foam seat cushion member 24 without the use of adhesives. The attachment method restricts lateral and vertical movement of the mat 30 relative to the foam member 24, which results in improved consistency and accuracy for the sensors 36 over the life of the vehicle.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A sensor assembly for a vehicle seat comprising:
a mat including a mat portion with a plurality of sensors and a mounting portion that is attachable to a seat cushion wherein the seat cushion is made from foam and includes a top surface, a bottom surface, and a pair of lateral seat edges that interconnect fore and aft seat edges, said mat being supported on said top surface, and wherein said mat includes at least one lateral edge adapted to extend along one of the pair of lateral seat edges, said mounting portion being located at least along said at least one lateral edge of said mat and extending from said mat portion such that said mounting portion is spaced apart from said plurality of sensors, and wherein said mounting portion comprises an ear extension that is free from sensors and which extends away from said mat portion; and
at least one fastener inserted through said mounting portion for receipt within the seat cushion to permanently attach said mat to the seat cushion and restrict lateral and vertical movement of said mat relative to the seat cushion with said at least one fastener extending only through said ear extension.

2. The assembly as set forth in claim 1 wherein said at least one fastener is comprised of a plurality of fasteners each having a body portion and a head portion with a larger diameter than said body portion, said head portion engaging a top surface of said mat when said fasteners are inserted through said mounting portion.

3. The assembly as set forth in claim 2 wherein said head portion is a top head and said body portion extends at a right angle relative to said top head and terminates at a distal end having a bottom head that engages said bottom surface of said foam.

4. The assembly as set forth in claim 1 wherein said foam includes a central area and a pair of side bolsters having a greater thickness than said central area, said central area and said bolsters being separated from each other by trenches.

5. The assembly as set forth in claim 1 wherein said at least one fastener comprises a first member having a plurality of hooks and a second member having a plurality of rings with one of said first or second members being integrally formed within said foam and the other of said first or second members being joined to said mounting portion such that when said mat is placed on said top surface of said foam said hooks engage said rings to attach said mat to said foam.

6. The assembly as set forth in claim 1 wherein said at least one fastener comprises a spiral member having a head portion and a resilient spiral body section that screws into said foam to secure said mat to said foam.

7. The assembly as set forth in claim 6 wherein said spiral body section is formed from a wire having a circular cross-section.

8. The assembly as set forth in claim 6 wherein said spiral body section is formed from plastic having a rectangular cross-section.

9. The assembly as set forth in claim 1 wherein said at least one fastener includes a first portion for engaging a surface of said mounting portion and a second portion at least partially embedded in the seat cushion.

10. The assembly as set forth in claim 1 wherein said mounting portion and said at least one fastener cooperate to define a predetermined permanent attachment position between said at least one fastener and said seat cushion such that said mat and said at least one fastener hold said plurality of sensors in said predetermined permanent attachment position while said plurality of sensors generate data for an occupant classification system.

11. The assembly as set forth in claim 1 wherein said at least one fastener comprises a head portion engaging a top surface of said mat and a body portion embedded in said seat cushion, wherein said mounting portion and said at least one fastener cooperate to define a predetermined permanent attachment position between said at least one fastener and said seat cushion such that said mat and said at least one fastener hold said plurality of sensors in said predetermined permanent attachment position while said plurality of sensors generate data for an occupant classification system.

12. The assembly as set forth in claim 1 wherein said at least one fastener is comprised of a plurality of fasteners each having a body portion and a head portion with a larger diameter than said body portion, said head portion engaging a top surface of said mat when said fasteners are inserted through said mounting portion.

13. A sensor assembly for a vehicle seat comprising:
a mat including a plurality of sensors and a mounting portion that is attachable to a seat cushion, wherein the seat cushion is made from foam and includes a top surface and a bottom surface, said mat being supportable on the top surface; and
at least one fastener inserted through said mounting portion for receipt within the seat cushion to permanently attach said mat to the seat cushion and restrict lateral and vertical movement of said mat relative to the seat cushion wherein said mounting portion comprises a plurality of ear extensions formed about the circumference of said mat and spaced apart from each other.

14. A sensor assembly for a vehicle seat comprising:
a mat including a plurality of sensors and a mounting portion that is attachable to a seat cushion, wherein the seat cushion is made from foam and includes a top surface and a bottom surface, said mat being supportable on the top surface; and
at least one fastener inserted through said mounting portion for receipt within the seat cushion to permanently attach said mat to the seat cushion and restrict lateral and vertical movement of said mat relative to the seat cushion, said at least one fastener comprising a plurality of fasteners each having a body portion and a head portion with a larger diameter than said body portion, said head portion engaging a top surface of said mat when said fasteners are inserted through said mounting portion, and wherein said body portion extends at an angle relative to said head portion and terminates at a barbed distal end that does not extend beyond said bottom surface of said foam.

15. The assembly as set forth in claim 14 wherein said foam includes a plurality of angled bores for receiving said fasteners.

16. A sensor assembly for a vehicle seat comprising:
a mat including a plurality of sensors and a mounting portion that is attachable to a seat cushion wherein the seat cushion is made from foam and includes a top surface and a bottom surface, said mat being supportable on the top surface with said foam including a central area and a pair of side bolsters having a greater thickness than said central area, said central area and said bolsters being separated from each other by trenches; and
at least one fastener inserted through said mounting portion for receipt within the seat cushion to permanently attach said mat to the seat cushion and restrict lateral and vertical movement of said mat relative to the seat cushion wherein said mounting portion extends into said trenches and said at least one fastener comprises a plurality of rings that secure said mounting portion to a structural member embedded in the foam of said trenches.

17. A vehicle seat assembly for use with an occupant classification system comprising:
a seat bottom having a cushion formed from foam with a top surface and a bottom surface;
a mat for placement on said top surface and including a mounting portion and a plurality of sensors for generating data for the occupant classification system, and wherein said mat includes a central body portion for supporting said plurality of sensors with said mounting portion comprising a plurality of ear extensions formed about a perimeter of said central body portion; and
at least one fastener for permanently attaching said mat to said foam via said mounting portion to restrict lateral and vertical movement of said mat relative to said foam.

18. The assembly as set forth in claim 17 wherein said at least one fastener comprises a first member having a plurality of hooks and a second member having a plurality of rings with one of said first or second members being integrally formed within said foam and the other of said first or second members being adhered to said mounting portion such that when said mat is placed on said top surface of said foam said hooks engage said rings to attach said mat to said foam.

19. The assembly as set forth in claim 17 wherein said at least one fastener comprises a plurality of fasteners each having a top head portion and a bottom head portion interconnected by a shaft extending at a right angle relative to said top and bottom head portions and wherein said fasteners are inserted through said mounting portion and into said foam such that said top head portion rests against said mat and said bottom head portion rests against said bottom surface of said foam.

20. The assembly as set forth in claim 17 wherein said at least one fastener comprises a plurality of fasteners having a head portion and a spiral body portion that is rotated into engagement with said foam such that said head portion rests against said mat.

21. The assembly as set forth in claim 17 wherein said at least one fastener includes a first portion for engaging a surface of one of said plurality of ear extensions and a second portion directly inserted through said one of said plurality of ear extensions such that said second portion is at least partially embedded within the seat cushion.

22. The assembly as set forth in claim 17 wherein said plurality of sensors are permanently attached to said mat and wherein said mounting portion and said at least one fastener cooperate to simultaneously attach said mat and said plurality of sensors to said foam to define a permanent attachment interface between said at least one fastener and said foam in a predetermined position such that said at least one fastener holds said mat and said plurality of sensors in said predetermined position while said plurality of sensors generate the data for the occupant classification system.

23. The assembly as set forth in claim 17 wherein said at least one fastener includes a first portion directly engaging a top or bottom surface of said mat and a second portion embedded within said cushion wherein said plurality of sensors are permanently attached to said mat and wherein said mounting portion and said at least one fastener cooperate to simultaneously attach said mat and said plurality of sensors to said foam to define a permanent attachment interface between said at least one fastener and said foam in a predetermined position such that said at least one fastener holds said mat and plurality of sensors in said predetermined position while said plurality of sensors generate the data for the occupant classification system.

24. The assembly as set forth in claim 17 wherein said at least one fastener is at least partially embedded in said foam.

25. A vehicle seat assembly for use with an occupant classification system comprising:
   a seat bottom having a cushion formed from foam with a top surface and a bottom surface;
   a mat for placement on said top surface and including a mounting portion and a plurality of sensors for generating data for the occupant classification system; and
   at least one fastener for permanently attaching said mat to said foam via said mounting portion to restrict lateral and vertical movement of said mat relative to said foam, wherein said at least one fastener comprises a plurality of fasteners each having a head portion and a body portion extending at an acute angle relative to said head portion to terminate at a barbed distal end.

26. The assembly as set forth in claim 25 wherein said foam includes a plurality of angled bores and wherein said fasteners are inserted through said mounting portion into said bores such that said head portion rests against a top surface of said mat and said barbed distal end does not extend beyond said bottom surface of said foam.

27. A vehicle seat assembly for use with an occupant classification system comprising:
   a seat bottom having a cushion formed from foam with a top surface and a bottom surface wherein said foam includes a central area and a pair of side bolsters having a greater thickness than said central area, said central area and said bolsters being separated from each other by trenches;
   a mat for placement on said top surface and including a mounting portion and a plurality of sensors for generating data for the occupant classification system, said mounting portions comprised of ear extensions formed about the circumference of said mat and spaced apart from each other, said ear extensions extending into said trenches; and
   at least one fastener for permanently attaching said mat to said foam via said mounting portion to restrict lateral and vertical movement of said mat relative to said foam, said at least one fastener being comprised of a plurality of rings that secure said ear extensions to a wire embedded in the foam of said trenches.

28. A sensor assembly for a vehicle seat comprising:
   a mat including a plurality of sensors and a mounting portion that is attachable to a seat cushion and wherein said mat includes a central body portion for supporting said plurality of sensors, said mounting portion comprising a plurality of ear extensions formed about a perimeter of said central body portion; and
   at least one fastener inserted through said mounting portion for receipt within the seat cushion to permanently attach said mat to the seat cushion and restrict lateral and vertical movement of said mat relative to the seat cushion, wherein said at least one fastener includes a first portion for engaging a surface of said mounting portion and a second portion at least partially embedded in the seat cushion, with said second portion of said fastener being inserted directly through said ear extensions.

* * * * *